O. J. CANTRELLE & G. ALEXANDER.
RELEASE VALVE.
APPLICATION FILED OCT. 12, 1917.

1,282,675.

Patented Oct. 22, 1918.

Witness
C. F. Rudolph
T. L. Roedaree

Inventor
O. J. Cantrelle
Geo. Alexander,

By Victor J. Evans,
Attorney

UNITED STATES PATENT OFFICE.

OLIVER JOSEPH CANTRELLE AND GEORGE ALEXANDER, OF NEW ORLEANS, LOUISIANA.

RELEASE-VALVE.

1,282,675.

Specification of Letters Patent.

Patented Oct. 22, 1918.

Application filed October 12, 1917. Serial No. 196,267.

*To all whom it may concern:*

Be it known that we, OLIVER J. CANTRELLE and GEORGE ALEXANDER, citizens of the United States, residing at New Orleans, in the county of Orleans and State of Louisiana, have invented new and useful Improvements in Release-Valves, of which the following is a specification.

This invention relates to air brake systems and particularly to release valves used in connection with the auxiliary reservoir.

The primary object of the invention is to provide a valve which will automatically exhaust the air from the auxiliary reservoir on each car, by operating angle cock on either end of the train line, allowing the air to escape slowly through the train line and release the brakes upon each car.

Another object is to provide a valve by means of which the auxiliary reservoir may be instantaneously charged when the automatic brake valve is in released position, such position of the said brake valve opening the auxiliary reservoir valve and permitting the entrance of air therein.

The invention also consists of the following novel combination and arrangement of parts, hereinafter more fully described and illustrated in the accompanying drawing, in which.

Figure 1:
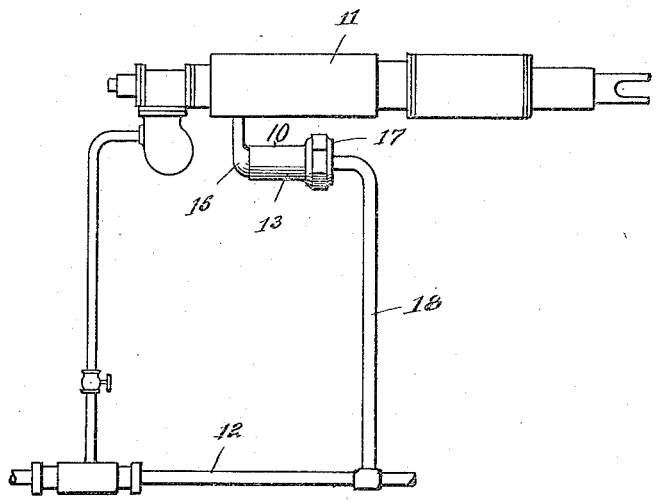
Figure 1 is a plan view of a portion of an air brake system, illustrating the auxiliary reservoir and its connection with the train line.

In air brake systems as used at the present time, after the train has been broken up the brakes remain applied due to the air pressure from the auxiliary reservoir upon each of the cars. Before the cars can be moved each of the reservoir valves must be manually opened so as to exhaust the air and release the brakes. As the valve must be held in an open position until all the air from the reservoir is released, much time is consumed and the trainmen are prevented from attending to other duties during this entire period.

The present invention aims to overcome these difficulties and disadvantages by providing means for automatically exhausting air from the auxiliary reservoir as soon as the train line connections are broken, so that by opening the angle cock at each end of the train line the auxiliary reservoir will be emptied.

For the accomplishment of this purpose the connection shown at 10 between the auxiliary reservoir 11 and the train line 12 is provided with an automatically operated valve which constitutes the present invention. This valve is contained within a cylinder or casing 13, one end of which is interiorly threaded as shown at 14 and is engaged with an elbow connection 15, by means of which communication is established between the valve casing 13 and auxiliary reservoir 11. The opposite end of the casing 13 is exteriorly threaded as shown at 16, for the reception of a union 17, by means of which the casing is connected to the short pipe section 18, which latter is in turn connected to the train line.

The casing 13 is formed with a valve chamber 19, which communicates with the elbow connection 15, the said chamber also communicating with the train line through an opening 20. The opening 20 is of lesser diameter than the chamber 19, so that a shoulder is formed at the juncture thereof, the said shoulder providing a seat 21 for a piston valve 22. The valve 22 may be of any suitable construction, which includes a rubber or other resilient seat 23, so that a tight joint may be made between the valve and the seat 21.

The valve 22 is capable of longitudinal movement within the chamber 19 and for this purpose is provided with a stem 24, which is guided within the opening 20. The stem 24 is surrounded by a helical spring 25 which acts to normally unseat the valve.

To release the brakes the angle cock at either end of the train line may be open, the opening of this cock serving to unseat the valve 22, so that air from the reservoir 11 will escape through the train line, the pressure of the air upon one side of the valve and spring upon the opposite side serving to retain the valve in neutral position until the reservoir is emptied. By this means the brakes from the entire train may be released simultaneously.

Figure 2:
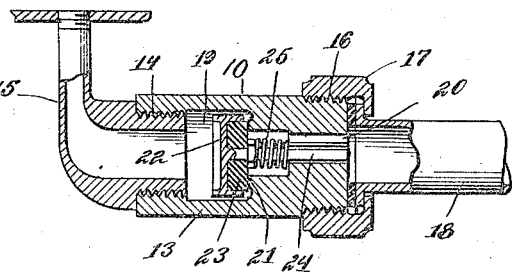
Fig. 2 is an enlarged sectional view through the connection between the auxiliary reservoir and the train line, showing the release valve in open position.
Figure 3:
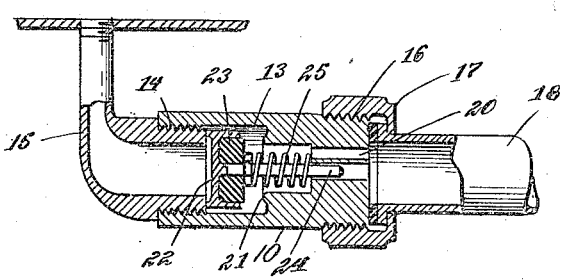
Fig. 3 is a similar view with the release valve in closed position.

In Fig. 2 the valve is shown in closed position with the spring compressed due to the pressure from the reservoir when the brakes are in an emergency application and the train line pressure is at zero. This has no effect on the auxiliary reservoir. When the angle cock is opened on the first or last car of the train in a gradual manner the valve 22 will not move, due to the pressure of the spring 25 which acts to keep the valve unseated. When a service or emergency application is made, the valve acts on the same member as a triple valve and consequently when the angle cock is opened in a gradual manner the air from the auxiliary reservoir will escape through the port 20 and through the train line to the atmosphere. By this means the brakes of the entire train line may be released simultaneously.

The spring 25 is of light gage and its purpose is to prevent the valve from closing while the brakes are being released.

Various changes may be made in the form, proportion and details of construction of the invention, without departing from the spirit or sacrificing any of the advantages thereof and the right is reserved to make such changes.

Having described the invention what we claim is:

1. The combination with an air brake system, of a release valve connected to the auxiliary reservoir, means for automatically opening said valve to exhaust the air from said reservoir and means for automatically closing the valve under pressure in the brake system.

2. The combination with an air brake system, of a release valve connecting the train line with the auxiliary reservoir and means whereby the opening of the train line will automatically discharge the air from the auxiliary reservoir.

3. The combination with an air brake system, of a release valve connecting the train line with the auxiliary reservoir and means including an automatically operated valve for discharging the air from the auxiliary reservoir simultaneously with the opening of the train line.

4. The combination with an air brake system, of a release valve connecting the train line with the auxiliary reservoir and means including a spring operated piston for discharging air from the auxiliary reservoir simultaneously with the opening of the train line.

In testimony whereof we affix our signatures.

OLIVER JOSEPH CANTRELLE.
GEORGE ALEXANDER.

Copies of this patent may be obtained for five cents each, by addressing the "Commissioner of Patents, Washington, D. C."